US006754205B1

(12) United States Patent
Sakaue

(10) Patent No.: US 6,754,205 B1
(45) Date of Patent: Jun. 22, 2004

(54) SWITCHING ELEMENT AND PACKET SWITCH

(75) Inventor: Kenji Sakaue, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/518,236

(22) Filed: Mar. 3, 2000

(30) Foreign Application Priority Data

Mar. 4, 1999 (JP) .......................................... 11-057596

(51) Int. Cl.[7] .............................................. H04L 12/56
(52) U.S. Cl. ..................................... 370/360; 370/388
(58) Field of Search ................................ 370/357, 389, 370/395.1, 388, 360, 412–414

(56) References Cited

U.S. PATENT DOCUMENTS

| 4,706,240 | A | * | 11/1987 | Payne, III | |
|---|---|---|---|---|---|
| 5,131,041 | A | * | 7/1992 | Brunner et al. | |
| 5,881,065 | A | * | 3/1999 | Abiru | 370/413 |
| 6,064,647 | A | * | 5/2000 | Van Krevelen | 370/228 |
| 6,230,229 | B1 | * | 5/2001 | Van Krevelen et al. | 710/131 |
| 6,563,837 | B2 | * | 5/2003 | Krishna et al. | 370/413 |
| 2002/0001304 | A1 | * | 1/2002 | Johnson et al. | |

FOREIGN PATENT DOCUMENTS

| JP | 10-224367 | 8/1998 |
|---|---|---|
| JP | 10-242985 | 9/1998 |

* cited by examiner

Primary Examiner—Kenneth Vanderpuye
(74) Attorney, Agent, or Firm—Finnegan, Henderson, Farabow, Garrett & Dunner, L.L.P.

(57) ABSTRACT

Input ports IP0 through IP8 transmit request packets by different two kinds of routing patterns A and B before actual cells are transmitted. The number of request packets having reached target output ports OP0 through OP8 is compared by a request packet comparing/measuring circuit CHP. The input ports IP0 through IP8 transmit actual cells by a routing pattern of the routing patterns A and B, by which the number of request packets having reached the target output ports is larger. Thus, the throughput of a packet switch is improved.

18 Claims, 12 Drawing Sheets

SWITCHING ELEMENT AND PACKET SWITCH

RELATED APPLICATION

This application claims benefit of priority under 35 U.S.C. §119 to Japanese Patent Application No. H11-57596, filed on Mar. 4, 1999, the entire contents of which are incorporated by reference herein.

BACKGROUND OF THE INVENTION

1. Field of the Invention

The present invention relates generally to a switching element and a packet switch. More specifically, the invention relates to a switching element for use in a packet switch on an input buffer system, and a packet switch on an input buffer system.

2. Description of Related Background Art

As a device for switching a fixed-length packet, there is an asynchronous transfer mode (ATM) switch. FIG. 11 shows the construction of a conventional ATM switch. As shown in FIG. 11, the ATM switch has a plurality of ATM cell transmitting mechanisms.

That is, as shown on the left in FIG. 11, the ATM switch has nine input ports IP0 through IP8, which are connected to nine input links Link 10 through Link 18, respectively. In addition, as shown on the right in FIG. 11, the ATM switch has nine output ports OP0 through OP8, which are connected nine output links Link 20 through Link 28, respectively. The ATM switch also has a switching network for transferring a cell, which is inputted from an optional input link of the input links Link 10 through Link 18, to an optional output link of the output links Link 20 through Link 28.

The switching network of the ATM switch comprises a plurality of switching elements SE00_00 through SE10_10, which are arranged in the form of lattice to be connected to each other. In the example of FIG. 11, there is shown a multistage connection construction of three stages assuming that a column of three switching elements arranged in vertical directions is one stage. One switching element in a certain stage is capable of transmitting a cell to all of the switching elements in the next stage.

The cell has destination information in its header, so that the cell transmitted from one of the input ports IP0 through IP8 to the switching network is designed to autonomously arrive at a target output port of the output ports OP0 through OP8 via each of the switching elements SE00_00 through SE10_10. Each of the switching elements SE00_00 through SE10_10 analyzes the destination information of the header of the cell, and transmits the cell to a target switching element in the next stage. Finally, the switching elements SE00_00 through SE10_10 in the third stage transmit the cell to a target one of the output ports OP0 through OP8.

One of the characteristics of the ATM switch is that when a cell transmitted from each of the input ports IP0 through IP8 in a certain cell cycle collides with another cell to be discarded, the ATM switch has the function of selecting a cell transmitting path different from the initial path in the next cell cycle to inhibit the cells from colliding with each other in the switching network.

The switching procedure will be described in detail below. The switching elements SE00_00 through SE10_00 in the first stage are designed to transmit cells, which are inputted from the input ports IP0 through IP8, to an optional switching element randomly selected from the switching elements SE00_01 through SE10_01 in the second stage.

At this time, if a cell collides with another cell in any one of the switching elements SE00_01 through SE10_01 in the second stage to be discarded without being selected by an arbiter, which is provided in each of the switching elements, so as not to arrive at a target one of the output ports OP0 through OP8, a negative acknowledge signal is returned to a corresponding one of the input ports IP0 through IP8, from which the discarded cell has been transmitted.

If a cell arrives at a target one of the output ports OP0 through OP8 without colliding with another cell in any one of the switching element SE00_01 through SE10_01 in the second stage, the negative acknowledge signal is not returned to the corresponding one of the input ports IP0 through IP8, from which the cell has been transmitted. In addition, even if a cell collides with another cell in any one of the switching element SE00_01 through SE10_01 in the second stage, if the cell is selected by the arbiter, which is provided in each of the switching elements, to arrive at a target one of the output ports OP0 through OP8, the negative acknowledge signal is not returned to corresponding one of the input port IP0 through IP8, from which the cell has been transmitted.

The negative acknowledge signal is generated in each of the switching elements SE00_01 through SE10_01. If a plurality of cells passing through the same output path are inputted to any one of the switching elements SE00_01 through SE10_01, the switching element performs conciliation in accordance with a predetermined algorithm to select and output any one of the cells. Then, the above described negative acknowledge signal is returned to a corresponding one of the input ports IP0 through IP8, from which an unselected one of the cells has been transmitted. The corresponding one of the input ports IP0 through IP8 having received the negative acknowledge signal retransmits the discarded cell in the next cell cycle since the cell transmitted therefrom has been discarded. At this time, a cell transmitting path (routing pattern) different from the cell cycle is selected.

In order to change the cell transmitting path (routing pattern), each of the switching elements SE00_00 through SE10_00 in the first stage has the function of transmitting a cell to any one of the switching elements SE00_01 through SE10_01 in the second stage. Then, a corresponding one of the switching elements SE00_00 through SE10_00 in the first stage transmits a cell to any one of the switching elements SE00_01 through SE10_01 in the second stage, which is different from that in the cell cycle, to change the cell transmitting path.

When the transmission of a cell ends in failure in the first cell cycle to retransmit the cell in the second cell cycle, it is possible to select a cell transmitting path, by which the number of discarded cells is smaller, in accordance with a predetermined algorithm. For example, the Evil-Twin algorithm is known as such an algorithm. By transmitting the cell in the second cell cycle in accordance with this algorithm, the number of collisions of cells in the switching network can be smaller than that when the cell is randomly transmitted in the second cell cycle.

As can be seen from the foregoing, in the conventional ATM switch, each of the input ports IP0 through IP8 selects only one cell transmitting path in one cell cycle. Then, when the first transmission of a cell ends in failure, the second transmission of the cell is tried in the next cell cycle. Therefore, there is a problem in that the probability of succeeding in the transmission of the cell by the first try is low. That is, there is a problem in that cells are easy to collide with each other in the switching network so that the network is clogged with the cells to reduce throughput. Such a problem tends to increase as the scale of the network increases.

FIG. 12 shows a status wherein, in a certain cell cycle, a cell to be transmitted from an input link Link 10 toward an output link Link 22 is inputted, and a cell to be transmitted from an input link Link 14 toward an output link Link 20 is inputted. By a routing pattern A shown in FIG. 12, these two cells collide with each other in a switching element SE00_01 in the second stage. Therefore, for example, the cell transmitted from the input link Link 14 is discarded without being selected by an arbiter, which is provided in the switching element SE00_01. The routing pattern A is herein a pattern determined at random or in accordance with a predetermined algorithm.

On the other hand, even in the same status as that in FIG. 12, it is possible to avoid the cell collision by a routing pattern B shown in FIG. 13. That is, by changing the path for one of the cells, it is possible to avoid the collision of the cells in the switching element SE00_01 in the second stage to transmit the cells to the target output links Link 22 without discarding the two cells. The routing pattern B is herein a pattern complementary to the routing pattern A.

Thus, in the conventional ATM switch, it is not possible to previously estimate a routing pattern, by which the number of cells to be discarded is small, before cells are transmitted from the input ports IP0 through IP8 to the switching network, so that there it problem in that the throughput in the ATM switch decreases.

SUMMARY OF THE INVENTION

It is therefore an object of the present invention to eliminate the aforementioned problems and to increase the number of passing cells by one cell transmitting try to decrease a cell residence time in an input port to improve the effective throughput in the whole switch.

In order to accomplish the aforementioned and other objects, according to one aspect of the present invention, a switching element for use in a packet switch, comprises; a crossbar switch for inputting packets from a plurality of packet input paths and for outputting the packets from one of a plurality of packet output paths in accordance with routing pattern information included in the packets; and an arbiter for inputting request packets from a plurality of request input paths and for outputting the request packets from one of a plurality of request output paths in accordance with routing pattern information included in the request packets, the arbiter selecting and outputting one of the request packets when the request packets are to collide with each other to be outputted to the same request output path of the plurality of request output paths.

According to another aspect of the present invention, a packet switch comprises: a plurality of input ports for accumulating and sequentially transmitting inputted packets and for transmitting first request packets by a first routing pattern and second request packets by a second routing pattern; a switching network for sequentially outputting the packets and the first and second request packets, which have been inputted from the plurality of input ports, to a target output port via a plurality of switching elements arranged in the form of lattice, each of the switching elements including: a crossbar switch for inputting the packets from a plurality of packet input paths and for outputting the packets from one of a plurality of packet output paths in accordance with routing pattern information included in the packets; a first arbiter for inputting the first request packets from a plurality of first input paths and for outputting the first request packets from one of a plurality of first output paths in accordance with routing pattern information included in the first request packets, the first arbiter selecting and outputting one of the first request packets when the first request packets are to collide with each other to be outputted to the same first output path of the plurality of first output paths; and a second arbiter for inputting the second request packets from a plurality of second input paths and for outputting the second request packets from one of a plurality of second output paths in accordance with routing pattern information included in the second request packets, the second arbiter selecting and outputting one of the second request packets when the second request packets are to collide with each other to be outputted to the same second output path of the plurality of second output paths; and a result output circuit for outputting a comparison result indicative signal for causing the input port to transmit packets by one of the first and second routing patterns in next cycle, by which more request packets have reached the output port, on the basis of the result of transmission of the first and second request packets.

According to another aspect of the present invention, a packet switch comprises: a plurality of input ports for accumulating and sequentially transmitting inputted packets, and for transmitting first request packets by a first routing pattern in the first half of a cycle before the packets are transmitted and for transmitting second request packets by a second routing pattern in the second half of the cycle; a switching network for sequentially outputting the packets and the first and second request packets, which have been inputted from the plurality of input ports, to a target output port via a plurality of switching elements arranged in the form of lattice, each of the switching elements including: a crossbar switch for inputting the packets from a plurality of packet input paths and for outputting the packets from one of a plurality of packet output paths in accordance with routing pattern information included in each of the packets; and an arbiter for inputting the first and second request packets from a plurality of request input paths and for outputting the first and second request packets from one of a plurality of request output paths in accordance with routing pattern information included in the first and second request packets, the arbiter selecting and outputting one of the first request packets when one of the first request packets collide with another of the first request packets to be outputted to the same request output path, and the arbiter selecting and outputting one of the second request packets when one of the second request packets collide with another of the second request packets to be outputted to the same request output path; and a result output circuit for outputting a comparison result indicative signal for causing the input port to transmit packets by a routing pattern of the first and second routing patterns in next cycle, by which more request packets have reached the output port, on the basis of the result of transmission of the first and second request packets.

According to a further aspect of the present invention, a packet switch comprising: a plurality of input ports for accumulating and sequentially transmitting inputted packets; a switching network for outputting the packets inputted from the plurality of input ports, to a target output port sequentially via a plurality of switching elements arranged in the form of lattice, each of the switching elements having a crossbar for selecting and outputting one of the packets when the packets collide with each other to be outputted to the same output path and for returning negative acknowledge signals to an input port, from which one of the packets being not selected has been transmitted; and a switching signal output circuit for counting the number of the negative acknowledge signals returned to the input ports and for outputting a switching indicative signal for causing the input ports to switch a routing pattern when the counted number of the negative acknowledge signals exceeds a predetermined value.

According to a still further aspect of the present invention, a packet switch comprises: a plurality of input ports for accumulating and sequentially transmitting inputted packets and for transmitting request packets by one routing pattern; a switching network for sequentially outputting the packets and the request packets, which have been inputted from the plurality of input ports, to a target output port via a plurality of switching elements arranged in the form of lattice, each of the switching elements including: a crossbar switch for inputting the packets from a plurality of packet input paths and for outputting the packets from one of a plurality of packet output paths in accordance with routing pattern information included in the packets; and an arbiter for inputting the request packets from a plurality of request input paths and for outputting the request packets from one of a plurality of request output paths in accordance with routing pattern information included in the request packets, the arbiter selecting and outputting one of the request packets when one of the request packets collides with another of the request packets to be outputted to the same request output path of the request output paths, and the arbiter returning negative acknowledge signals to a transmission source or sources having transmitted the request packets being not selected; and a switching signal output circuit for counting the number of the negative acknowledge signals returned to the input ports and for outputting a switching indicative signal for causing the input ports to transmit the packets by a routing pattern different from the one routing pattern in next cycle.

DESCRIPTION OF THE PREFERRED EMBODIMENT (First Preferred Embodiment)

In the first preferred embodiment of the present invention, request packets are transmitted by different two kinds of routing patterns before an actual cell is transmitted, and the actual cell is transmitted by one of the routing patterns, by which the number of reachable cells is larger, to improve the throughput of an ATM switch. Referring to the accompanying drawings, this preferred embodiment will be described in detail below.

Figure 1:
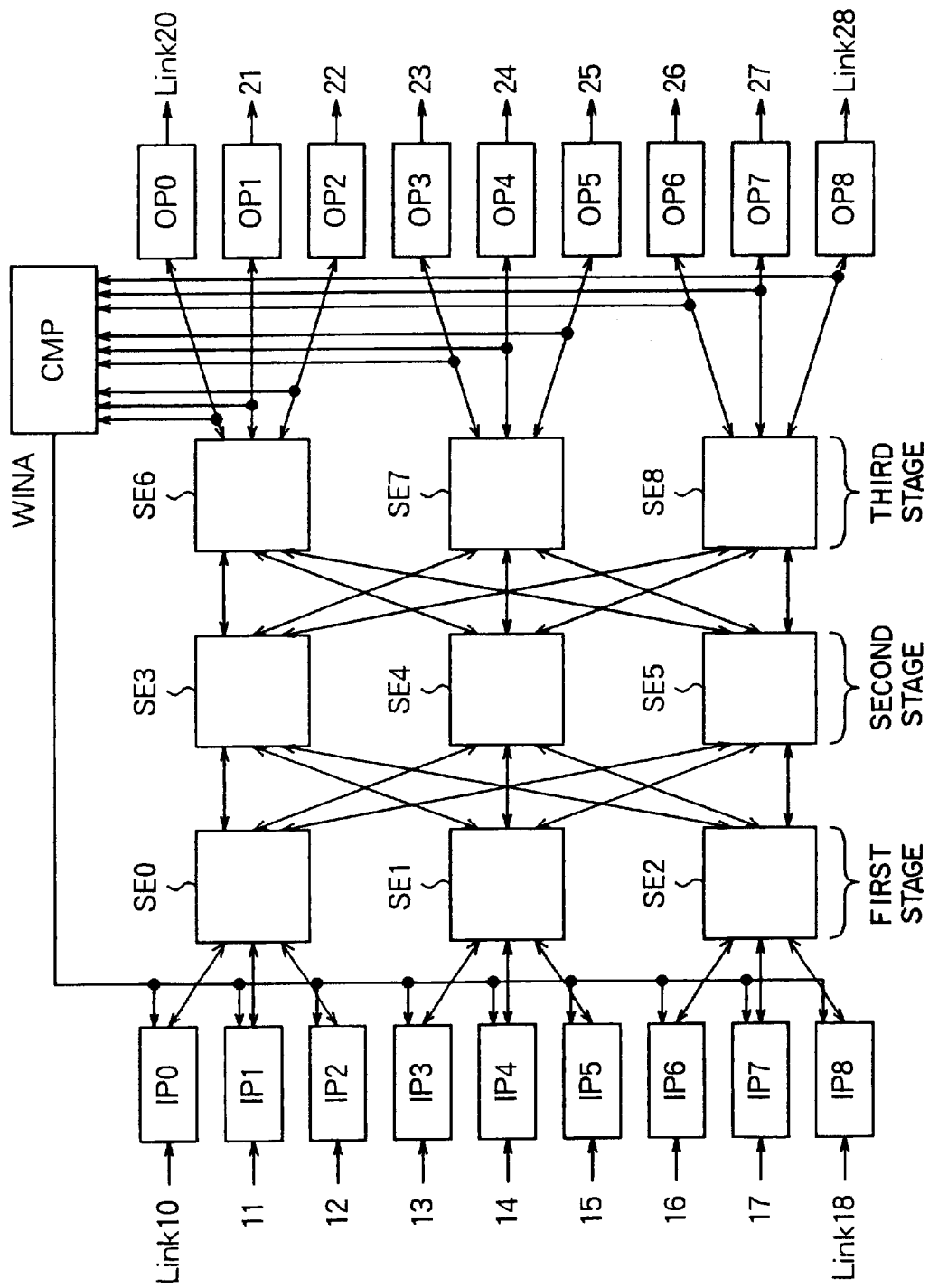
FIG. 1 is a diagram showing the whole construction of the first preferred embodiment of an ATM switch according to the present invention.

FIG. 1 shows the whole construction of the first preferred embodiment of an ATM switch according to the present invention. As shown in FIG. 1, the ATM switch has nine input ports IP0 through IP8. Input links Link 10 through Link 18 are connected to the input ports IP0 through IP8, respectively. The ATM switch also has nine output ports OP0 through OP8. Output links Link 20 through Link 28 are connected to the output ports OP0 through OP8, respectively.

Between the input ports IP0 through IP8 and the output ports OP0 through OP8, switching elements SE0 through SE8 are interconnected to each other in the form of lattice to form a switch network.

For example, the input ports IP0 through IP2 are interconnected to the switching element SE0. Therefore, the input ports IP0 through IP2 are capable of transmitting cells and request packets to the switching element SE0, and the switching element SE0 is capable of transmitting negative acknowledge signals to the input ports IP0 through IP2.

The transmission of cells from the input ports IP0 through IP2 and the transmission of two request packets therefrom are performed in the same cell cycle. For example, in one cell cycle, the input port IP0 is capable of transmitting a cell to the switching element SE0 while the input port IP1 is capable of transmitting request packets to the switching element SE0 by two routing patterns A and B. The input port IP1 holds a cell which is intended to be transmitted in the next cell cycle, and before the cell is transmitted, it is previously examined which of the two routing patterns A and B is better to transmit the cell.

In addition, the switching element SE0 is interconnected to the switching elements SE3 through SE5. Therefore, the switching element SE0 is capable of transmitting a cell and two request packet to any one of the switching elements SE3 through SE5, and the switching elements SE3 through SE5 are capable of transmitting a negative acknowledge signal to the switching element SE0. The two request packets are transmitted by routing patterns A and B.

The routing pattern A is a pattern which is determined at random or by a predetermined algorithm, and the routing pattern B is a pattern which is complementary to the routing pattern A. These complementary patterns are prepared by a generative algorithm, such as the Evil-Twin.

For example, when the input port IP0 transmits a cell and request packets to the output port OP0, the routing patterns include (1) a pattern via the switching elements SE0, SE3 and SE6, (2) a pattern via the switching elements SE0, SE4 and SE6, and (3) a pattern via the switching elements SE0, SE5 and SE6. For example, among these three patterns, (1) the pattern via the switching elements SE0, SE3 and SE6 is assumed to be the routing pattern A, and (2) the pattern via the switching elements SE0, SE4 and SE6 is assumed to be the routing pattern B.

Which routing pattern is used for transmitting the cell and request packets is embedded as a routing pattern information in the cell and request packets when the input ports IP0 through IP8 transmits the cell and request packets. Therefore, each of the switching elements SE0 through SE8 performs switching on the basis of the routing pattern information embedded in the cell and request packets.

The switching elements SE1 through SE8 have the same operation as that of the switching element SE0. However, the switching elements SE6 through SE8 are capable of transmitting a cell to the output ports OP0 through OP8. In addition, the switching elements SE6 through SE8 are capable of transmitting two request packets to a request packet measuring/comparing circuit CMP. That is, the switching elements SE6 through SE8 are capable of transmitting the request packets, which have reached the switching elements SE6 through SE8 by the two routing patterns A and B, to the request packet measuring/comparing circuit CHP.

The request packet measuring/comparing circuit CMP has the function of counting the number of request packets. That is, the request packet measuring/comparing circuit CMP has the function of counting the number of request packets, which have reached the output ports OP0 through OP8 by the routing pattern A, and the number of request packets, which have reached the output ports OP0 through OP8 by the routing pattern B, to compare both numbers. The comparison result is transmitted to each of the input ports IP0 through IP8 as a comparison result indicative signal WINA. On the basis of the comparison result indicative signal WINA, each of the input ports IP0 through IP8 transmits a cell in the next cell cycle by one of the routing patterns A and B, by which the number of cells having reached a target one of the output ports OP0 through OP8 is larger.

Figure 2:
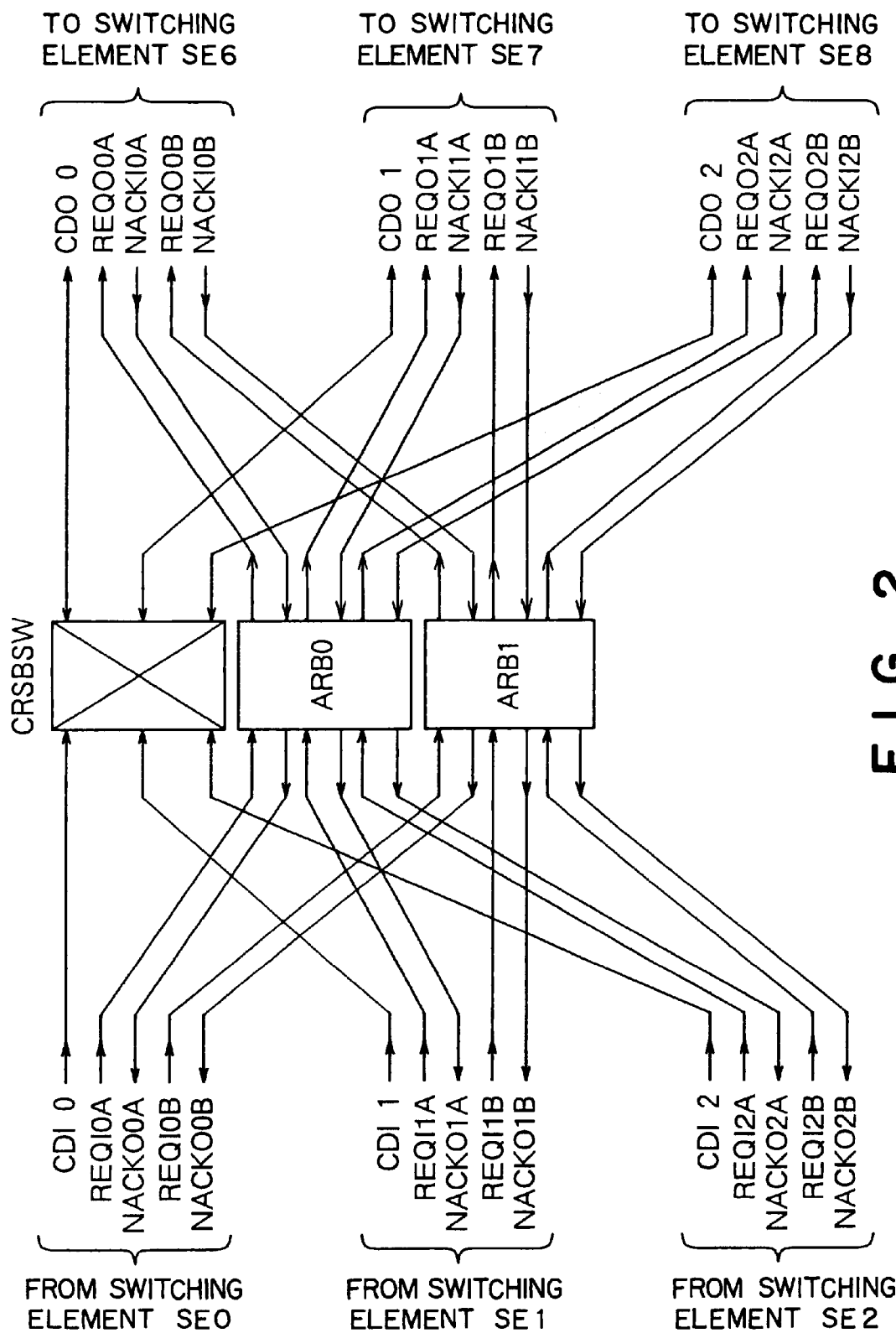
FIG. 2 is a diagram showing the internal construction of switching elements of FIG. 1.

FIG. 2 shows an example of the internal construction of the switching elements SE3 through SE5 in the second stage.

As shown in FIG. 2, each of the switching elements SE3 through SE5 comprises a crossbar switch CRSBSW, a first arbiter ARB0, and a second arbiter ARB1.

To the crossbar switch CRSBSW, cells CDI0 through CDI2 are inputted from the switching elements SE0 through SE2 in the first stage. Then, the crossbar switch CRSBSW outputs cells CDO0 thorough CDO2 to any one of the switching elements SE6 through SE8 on the basis of destination information (routing pattern information) included in cell headers.

To the first arbiter ARB0, request packets REDI0A through REQI2A of the routing pattern A are inputted from the switching elements SE0 through SE2 in the first stage. Then, the first arbiter ARB0 outputs request packets REQDO0A through REQO02A to the switching elements SE6 through SE8 in the third stage on the basis of routing pattern information included in the request packets RBQI0A through REQI2A.

In addition, if a plurality of request packets of the request packets REQI0A through REQI2A for the same output path arrive at the first arbiter ARB0, the first arbiter ARB0 selects any one of the request packets and discards other request packets. If the request packets are thus discarded, negative acknowledge signals are returned to the corresponding input ports IP0 through IP2 which have transmitted the discarded request packets. That is, negative acknowledge signals NACKO0A through NACKO2A are outputted to the switching elements SE0 through SE2 in the first stage.

Moreover, if the request packets REQO0A through REQO2A transmitted by the routing pattern A collide with each other in the switching elements SE6 through SE8 in the third stage, negative acknowledge signals NACKO0A through NACKO2A are inputted to the first arbiter ARB0 from the switching elements SE6 through SE8 in the third stage. Then, the first arbiter ARB0 outputs negative acknowledge signal NACKO0A through NACKO2A to the corresponding switching elements SE0 through SE2 in the first stage, which have transmitted the cells having collided with each other.

To the second arbiter ARB1, request packets REQI0B through REQI2B transmitted by the routing pattern B are inputted from the switching elements SE0 through SE2 in the first stage. Then, the second arbiter ARB1 outputs request packets REQO0B through REQO2B to the switching elements SE6 through SE8 in the third stage on the basis of routing pattern information included in the request packets REQI0B through REQI2B.

In addition, if a plurality of request packets of the request packets REQI0B through REQI2B for the same output arrive at the second arbiter ARB1, the second arbiter ARB1 selects any one of the request packets and discards other request packets. If the request packets are thus discarded, negative acknowledge signals are returned to the corresponding input ports IP0 through IP2 which have transmitted the discarded request packets. That is, negative acknowledge signals NACKO0B through NACKO2B are outputted to the switching elements SE0 through SE2 in the first stage.

Moreover, if the request packets REQO0B through REQO2B transmitted by the routing pattern B collide with each other in the switching elements SE6 through SE8 in the third stage, negative acknowledge signals NACKI0B through NACKI2B are inputted to the second arbiter ARB1 from the switching elements SE6 through SE8 in the third stage. Then, the second arbiter ARB1 outputs negative acknowledge signal NACKO0B through NACKO2B to the corresponding switching elements SE0 through SE2 in the first stage, which have transmitted the cells having collided with each other.

Figure 3:
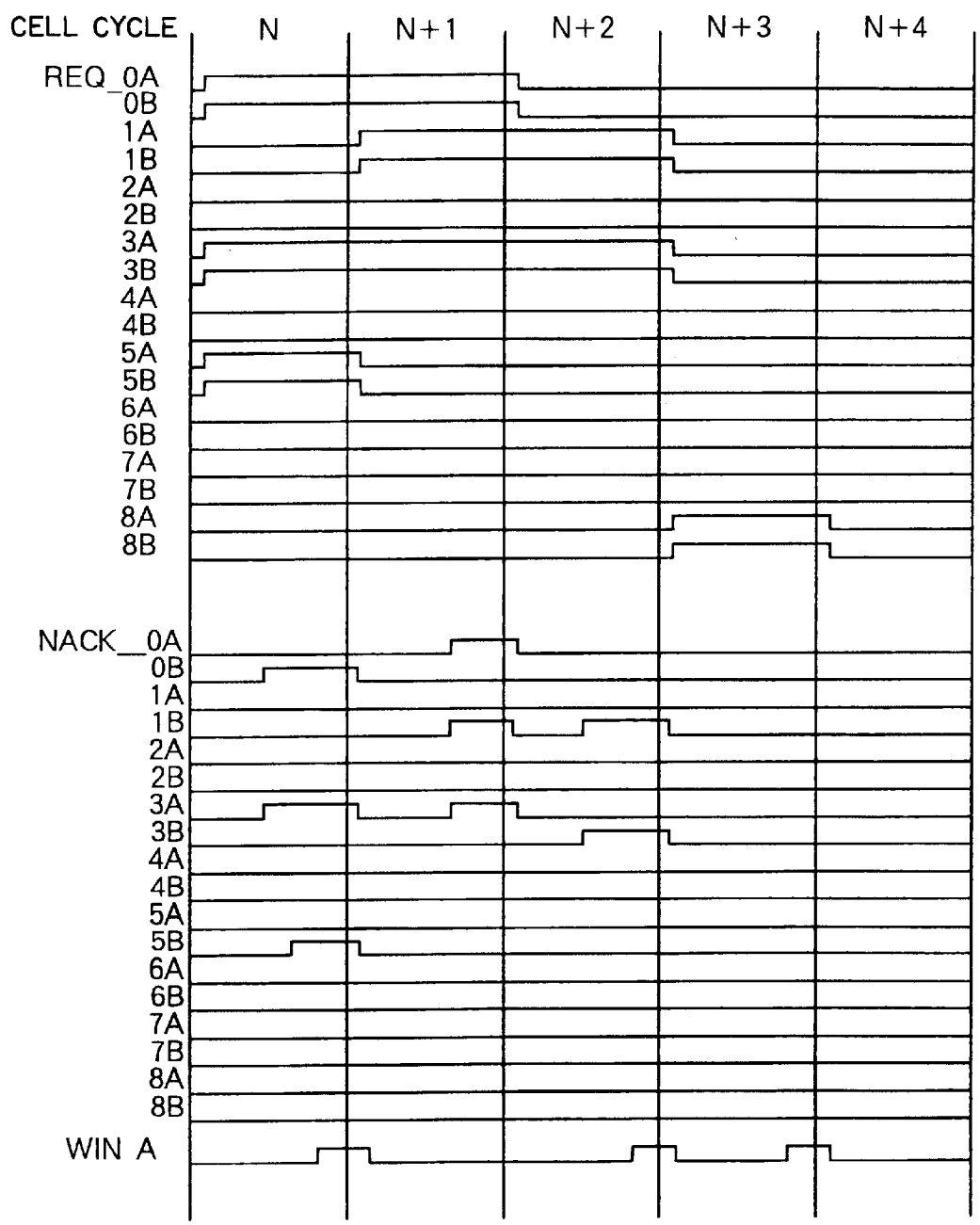
FIG. 3 is a timing chart for explaining the relationship between a request packet signal and a negative acknowledge signal when the ATM switch of FIG. 1 is operated.

The construction and schematic operation of the ATM switch in this preferred embodiment have been described above. Referring to FIG. 3, the operation of the ARM switch in this preferred embodiment will be described in detail below. FIG. 3 is a timing chart for the ATM switch in this preferred embodiment.

FIG. 3 shows timings in transmitting request packets from the input ports IP0 through IP8 in cell cycles N, N+1, N+2, N+3 and N+4. In FIG. 3, REQ_0A denotes a signal of a request packet transmitted by the routing pattern A from the input port IP0, and REQ_0B denotes a signal of a request packet transmitted by the routing pattern B from the input port IP0. Similarly, REQ_8A denotes a signal of a request packet transmitted by the routing pattern A from the input port IP8, and REQ_8B denotes a signal of a request packet transmitted by the routing pattern B from the input port IP8.

In addition, NACK_0A denotes a negative acknowledge signal received by the input port IP0 when a request packet transmitted by the routing pattern A from the input port IP0 is discarded, and NACK_0B denotes a negative acknowledge signal received by the input port IP0 when a request packet transmitted by the routing pattern B from the input port IP0 is discarded. Similarly, NACK_8A denotes a negative acknowledge signal received by the input port IP8 when a request packet transmitted by the routing pattern A from the input port IP8 is discarded, and NACK_8B denotes a negative acknowledge signal received by the input port IP8 when a request packet transmitted by the routing pattern B from the input port IP8 is discarded.

As shown in FIG. 3, each of the input ports IP0 through IP8 transmits request packets by two kinds of transmission paths of the routing pattern A and B with respect to one cell in one cell cycle. Thus, the request packets are transmitted by the two kinds of routing patterns to previously examine the number of reaching cells when an actual cell is transmitted in the next cell cycle.

In this example, in the cell cycle N, the input ports IP0, IP3 and IP5 transmit request packets by two kinds of the routing patterns A and B. In the cell cycle N+1, the input ports IP0, IP1 and IP3 transmit request packets by two kinds of the routing patterns A and B. In the cell cycle N+2, the input ports IP1 and IP3 transmit request packets by two kinds of the routing patterns A and B. In the cell cycle N+3, the input port IP8 transmits request packets by two kinds of the routing patterns A and B.

Then, at the end of the cell cycle N, negative acknowledge signals NACK_0B, NACK_3A and NACK_5B are asserted to be in a high level. This means that the request packet REQ_0B transmitted from the input port IP0 by the routing pattern B is discarded in the switching network so as not to reach any one of the output ports OP0 through OP8, means that the request packet REQ_3A transmitted from the input port IP3 by the routing pattern A is discarded in the switching network so as not to reach any one of the output ports OP0 through OP8, and means that the request packet REQ_5B transmitted from the input port IP5 by the routing pattern B is discarded in the switching network so as not to reach any one of the output ports OP0 through OP8.

At the end of the cell cycle N, the request packet measuring/comparing circuit CMP counts the number of all of the request packets which have reached the output ports OP0 through OP8. Then, the request packet measuring/comparing circuit CMP compares whether the number of request packets transmitted by the routing pattern A or B is larger. Furthermore, if both are the same, it is previously set to select the routing pattern A, for example.

This comparison result is transmitted to all of the input ports IP0 through IP8 as a comparison result indicative signal WINA. For example, in the cell cycle N, the number of request packets having reached the output ports OP0 through OP8 is two by the routing pattern A and one by the routing pattern B, so that the comparison result indicative signal WINA is asserted to be in a high level. The input ports IP0 and IP5 having received the comparison result indicative signal WINA transmit actual cells by the routing pattern A in the cell cycle N+1 which is the next cell cycle. That is, the input ports IP0 and IP5 transmit the actual cells by the routing pattern A, by which the number of cells capable of reaching the output ports OP0 through OP8 is larger. However, with respect to the request packets transmitted by the routing pattern A, the input port IP3 having received the negative acknowledge signal NACK_3A does not transmit cells in the cell cycle N+1. Because it can be previously seen that cells transmitted from the input port IP3 by the routing pattern A collide with each other to be discarded even if the cells are transmitted from the input port IP3 by the routing pattern A.

In addition, at the end of cell cycle N+1, negative acknowledge signals NACK_0A, NACK_1B and NACK_3A are asserted to be in a high level. This means that the request packet REQ_0A transmitted from the input port IP0 by the routing pattern A is discarded in the switching network so as not to reach any one of the output ports OP0 through OP8, means that the request packet REQ_1B transmitted from the input port IP1 by the routing pattern B is discarded in the switching network so as not to reach any one of the output ports OP0 through OP8, and means that the request packet REQ_3A transmitted from the input port IP3 by the routing pattern A is discarded in the switching network so as not to reach any one of the output ports OP0 through OP8.

At the end of the cell cycle N+1, the request packet measuring/comparing circuit CMP counts the number of all of the request packets which have reached the output ports OP0 through OP8, and compares which number of request packets transmitted by the routing pattern A or B is larger.

This comparison result is transmitted to all of the input ports IP0 through IP8 as a comparison result indicative signal WINA. For example, in the cell cycle N+1, the number of request packets having reached the output ports OP0 through OP8 is one by the routing pattern A and two by the routing pattern B, so that the comparison result indicative signal WINA is not asserted to be in a law level. The input ports IP0 and IP3 having received the comparison result indicative signal WINA transmit actual cells by the routing pattern B in the cell cycle N+2 which is the next cell cycle. That is, the input ports IP0 and IP3 transmit the actual cells by the routing pattern B, by which the number of cells capable of reaching the output ports OP0 through OP8 is larger. However, with respect to the request packets transmitted by the routing pattern B, the input port IP1 having received the negative acknowledge signal NACK_1B does not transmit cells in the cell cycle N+2. Because it can be previously seen that cells transmitted from the input port IP1 by the routing pattern B collide with each other to be discarded even if the cells are transmitted from the input port IP1 by the routing pattern B.

Figure 4:
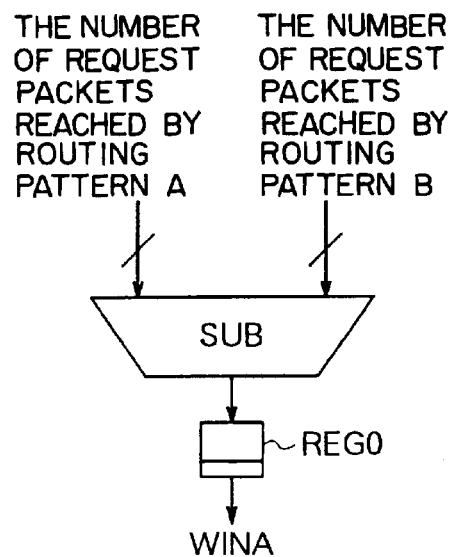
FIG. 4 is a diagram showing an example of a circuit construction of a request packet measuring/comparing circuit.
Figure 5:
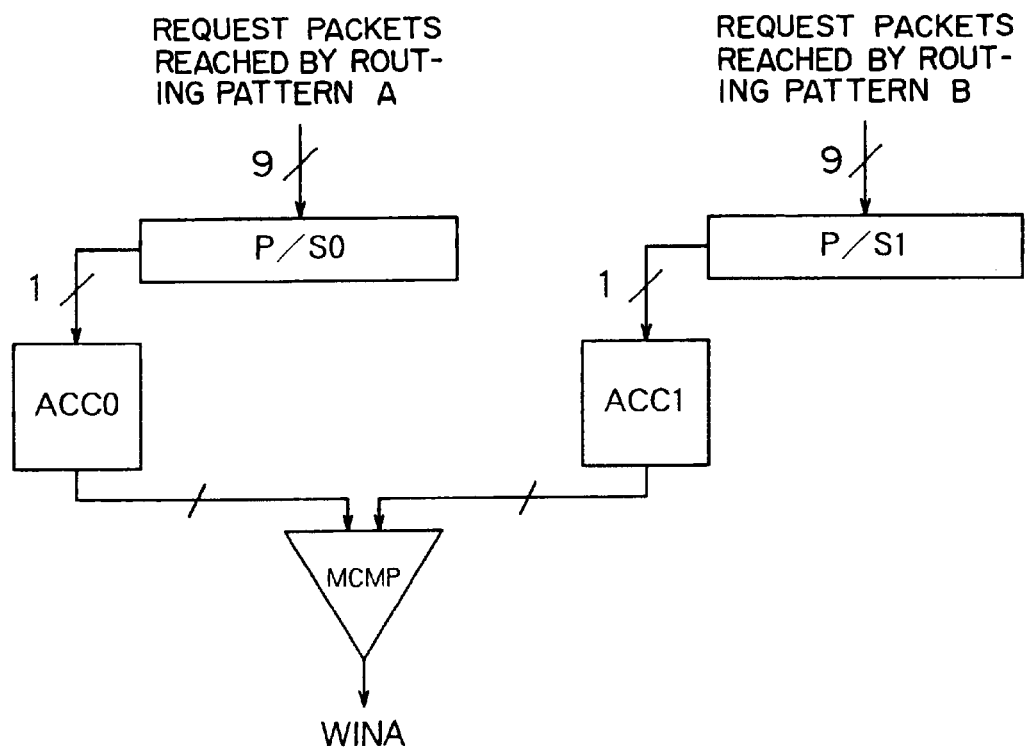
FIG. 5 is a diagram showing another example of a circuit construction of a request packet measuring/comparing circuit.
Figure 6:
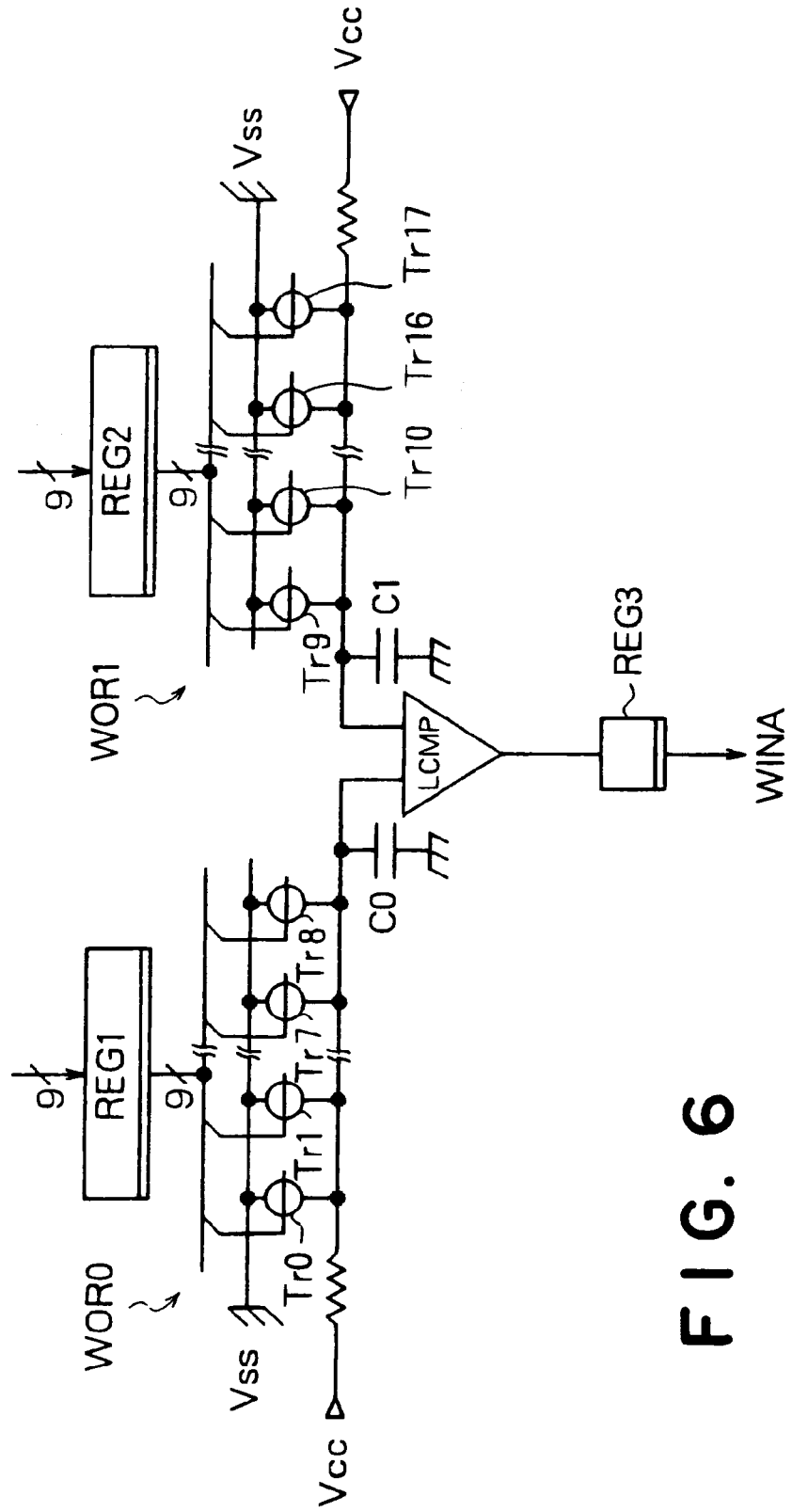
FIG. 6 is a diagram showing a further example of a circuit construction of a request packet measuring/comparing circuit.

Referring to FIGS. 4 through 6, examples of circuit constructions of a request packet measuring/comparing circuit CMP will be described below. FIGS. 4 through 6 shows examples of circuit constructions of a request packet measuring/comparing circuit CMP.

As shown in FIG. 4, the request packet measuring/comparing circuit CMP comprises a multi-bit subtracter SUB and a determination result register REG0. To the multi-bit subtracter SUB, a counted value of request packets having reached by the routing pattern A, and a counted value of request packets having reached by the routing pattern B are inputted. Then, the multi-bit subtracter SUB derives a difference between these counted values to output a differential signal representative thereof. That is, the number of request packets having reached by the routing pattern B is subtracted from the number of request packets having reached by the routing pattern A, and the result thereof is outputted to the register REG0 as a differential signal.

The register REG0 having inputted the differential signal outputs a comparison result indicative signal WINA on the basis of the differential signal. In this preferred embodiment, the register REG0 causes the comparison result indicative signal WINA to be in a high level if the differential signal is positive or 0, i.e., if the number of request packets having reached by the routing pattern A is larger, and the register REG0 causes the comparison result indicative signal WINA to be in a low level if the differential signal is negative, i.e., if the number of request packets having reached by the routing pattern B is larger.

FIG. 5 shows another example of a request packet measuring/comparing circuit CMP. As shown in FIG. 5, the request packet measuring/comparing circuit CMP comprises parallel/serial converters P/S0 and P/S1, accumulators ACC0 and ACC1, and a magnitude comparator MCMP.

To the parallel/serial converter P/S0, a request packet having reached by the routing pattern A is inputted as a parallel signal. That is, a 9-bit parallel signal, such as "001000001", is inputted. This example shows that one request packet has reached when "1" stands in a bit. This parallel signal is converted into a serial signal by the parallel/serial converter P/S0 to be outputted to the accumulator ACC0. The accumulator ACC0 counts the number of bits, in which "1" stands, in the serial signal, and outputs a counted value to the magnitude comparator MCMP as digital data. That is, the number of request packets having reached by the routing pattern A is inputted to the magnitude comparator MCMP.

The parallel/serial converter P/S1 and accumulator ACC1 perform the same operations as those of the above described parallel/serial converter P/S0 and accumulator ACC0, with respect to the routing pattern B. Therefore, the number of request packets having reached by the routing pattern B is inputted to the magnitude comparator MCMP.

The magnitude comparator MCMP compares the number of request packets having reached by the routing pattern A with the number of request packets having reached by the routing pattern B to output a comparison result indicative signal WINA. That is, in this preferred embodiment, the magnitude comparator MCMP causes the comparison result indicative signal WINA to be in a high level if the number of request packets having reached by the routing pattern A is larger, and the magnitude comparator MT causes the comparison result indicative signal WINA to be in a low level if the number of request packets having reached by the routing pattern B is larger.

FIG. 6 shows a further example of a request packet measuring/comparing circuit CMP. As shown in FIG. 6, the request packet measuring/comparing circuit CMP comprises registers REG1 and REG2, N-type transistors Tr0 through Tr17, capacitors C0 and C1, a level comparator LCMP, and a 1-bit register REG3.

To the register REG1, a bit map information having bits of "1", the number of which is the same as the number of request packets having reached by the routing pattern A, is inputted. Similarly, to the register REG2, a bit map information having bits of "1", the number of which is the same as the number of request packets having reached by the routing pattern B, is inputted.

The N-type transistors Tr0 through Tr8 constitute a wired-OR circuit WOR0. To the output node side of the wired-OR WOR0, a capacitor C0 having a predetermined capacity is connected. In addition, N-type transistors Tr9 through Tr17 constitute a wired-OR circuit WOR1. To the output node side of the wired-OR circuit WOR1, a capacitor C1 having a predetermined capacity is connected. That is, the request packet measuring/comparing circuit CMP has two systems of wired-OR circuits WOR0 and WOR1, the output nodes of which are connected to the level comparator LCMP which is a sense amplifier.

In the request packet measuring/comparing circuit CMP, the capacitors C0 and C1 are previously charged. Then, high level signals, the number of which corresponds to the number of bits of 1 inputted from the register REG1 to the wired-OR circuit WOR0, are outputted to turn on one or more of the transistors Tr0 through Tr8, the number of which corresponds to the number of the high level signals. In addition, at the same timing, high level signals, the number of which corresponds to the number of bits of "1" inputted from the register REG2 to the wired-OR circuit WOR1, are outputted to turn on one or more of the transistors Tr9 through Tr17, the number of which corresponds to the number of the high level signals.

One of the capacitors C0 and C1 corresponding to one of the wired-OR circuits WOR0 and WOR1, to which a greater number of high level signals are inputted, is more rapidly charged. For example, when the transistors Tr7 and Tr8 of the wired-OR circuit WOR0 are turned on and when the transistor Tr17 of the wired-OR circuit WOR1 is turned on, the capacitor C0 is more rapidly charged than the capacitor C1. Therefore, if the difference between the times required to discharge the capacitors C0 and C1 is sensed by the level comparator LCMP, it is possible to compare the numbers of reaching request packets. This comparison result is outputted to the register REG3, which outputs a comparison result indicative signal WINA.

As described above, according to the ATM switch in this preferred embodiment, the number of passable cells through the two routing patterns A and B is predicted before actual cells are transmitted from the input ports IP0 through IP8, and the actual cells are transmitted by a routing pattern, by which the predicted number of passable cells is larger, so that it is possible to increase the number of cells passing through the ATM switch by one transmission of cells.

That is, in a cell cycle before the actual cells are transmitted from the input ports IP0 through IP8, the request packets are transmitted by the routing patterns A and B, and the numbers of request packets having reached a target one of the output ports OP0 through OP8 are compared by the request packet measuring/comparing circuit CMP. Then, this comparison result is fed back to the input ports IP0 through IP8 as a comparison result indicative signal WINA. In the next cell cycle, on the basis of the comparison result indicative signal WINA, actual cells are transmitted by a routing pattern, by which the number of request packets having reached is larger. Therefore, it is possible to increase the number of cells passing through the ATM switch by one try.

By thus increasing the number of passable cells, it is possible to reduce the cell residence time in the input ports IP0 through IP8 to improve the throughput of the whole ATM switch.

In addition, when the request packets transmitted in the last cell cycle are to be transmitted by a routing pattern having received a negative acknowledge signal, the input ports IP0 through IP8 are not designed to transmit actual cells in the next cell cycle. Therefore, all of the actual cells transmitted from the input ports IP0 through IP8 can reach the output ports OP0 through OP8 in principle. In addition, by such a construction, it is possible to easily manage a queue for cells waiting for transmission in the input ports IP0 through IP8. That is, if there is some possibility that the cells actually transmitted from the input ports IP0 through IP8 are discarded, the input ports IP0 through IP8 can not erase the transmitted cells accumulated in the queue immediately after the cell is transmitted. Because if the input ports IP0 through IP8 could not receive acknowledge signals from the output ports OP0 through OP8 with respect to the transmitted cell after a predetermined period of time, the cell must be retransmitted. On the other hand, in this preferred embodiment, all of the cells transmitted from the input ports IP0 through IP8 reach the output ports OP0 through OP8 in principle, the input ports IP0 through IP8 can delete the cell from the queue immediately after the cell is transmitted. Therefore, it is possible to simply manage the queue in the input ports IP0 through IP8.

Moreover, the routing pattern A is determined at random, and the routing pattern B is determined as a pattern which is complementary to the routing pattern A. Therefore, it is possible to more improve the throughput.

(Second Preferred Embodiment)

The second preferred embodiment of the present invention is that, in the above described first preferred embodiment, request packets are transmitted by the routing pattern A in the first half of one cell cycle and by the routing pattern B in the second half of the cell cycle to simplify the construction of the ATM switch.

Figure 7:
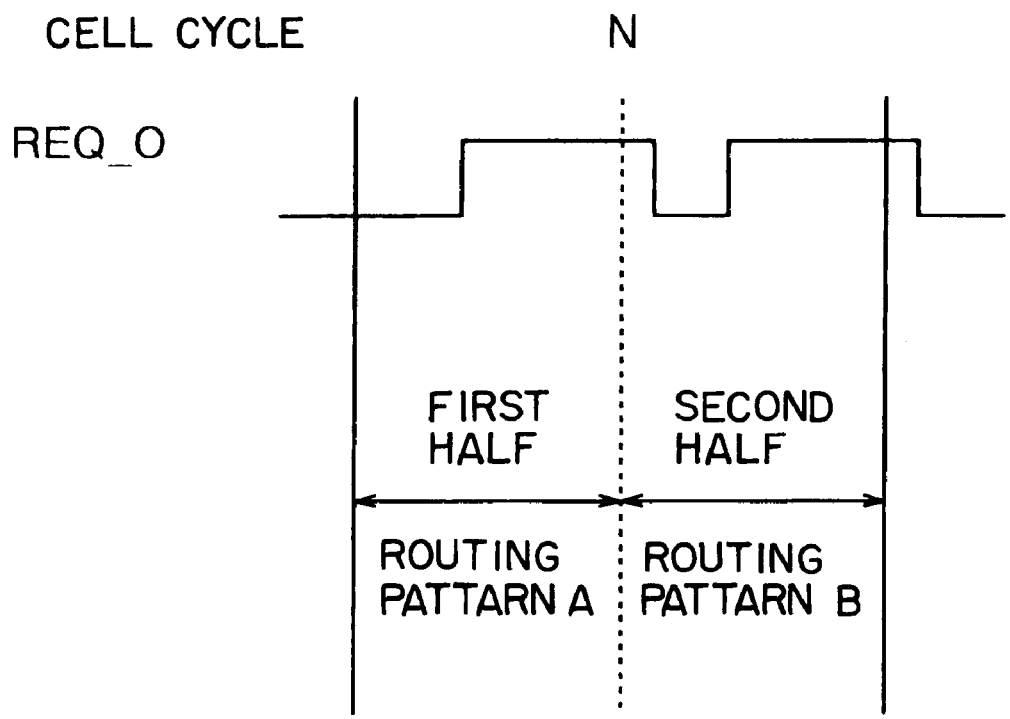
FIG. 7 is a chart showing a timing in transmitting a request packet from an input port of the second preferred embodiment of an ATM switch according to the present invention.

FIG. 7 shows a timing in transmitting request packets from one of the input ports IP0 through IP8 in the second preferred embodiment. In FIG. 7, there is supposed a case where the input port IP0 transmits request packets.

As shown in FIG. 7, the input port IP0 transmits requests packet by the routing pattern A in the first half of the cell cycle N. Then, the input port IP0 transmits request packets by the routing pattern B in the second half of the cell cycle N. Thus, each of the input ports IP0 through IP8 divides the cell cycle into the first and second halves to transmit the request packets by the routing patterns A and B in the cell cycle before actual cells are transmitted.

Then, the actual cells are transmitted by one of the routing patterns A and B, by which the number of request packets having reached a target one of the output ports OP0 through OP8 is larger. That is, the actual cells are transmitted in the cell cycle N+1.

As described above, according to the ATM switch in this preferred embodiment, if there is time for transmission, the system for transmitting request packets is set to be one system, which is used for time-sharing transmitting request packets to the switching network sequentially by the routing patterns A and B, so that it is possible to simplify the construction of the switching element. That is, it has only to omit the arbiter ARB1 of the switching element shown in FIG. 2 to provide only one system of input/output channel for request packets.

Moreover, since a circuit for summing up the number of request packets in the request packet measuring/comparing circuit CMP has only to be one system, it is possible to inhibit the circuit scale of the whole ATM switch from increasing.

(Third Preferred Embodiment)

The third preferred embodiment of the present invention is that, in the above described first preferred embodiment, an apparent cell size is extended to insert a request information into the extended field to omit the input/output system for request packets in the ATM switch.

Figure 8:
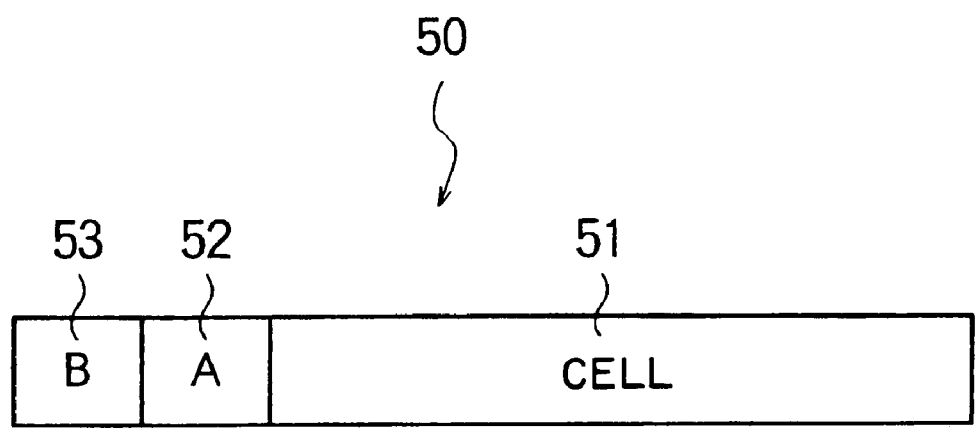
FIG. 8 is a diagram showing the structure of an extended cell in the third preferred embodiment of an ATM switch according to the present invention.

FIG. 8 shows an extended cell structure in an ATM switch in this preferred embodiment. As shown in FIG. 8, in this preferred embodiment, an apparent cell size is extended as an extended cell 50 so as to be greater than an actual cell 51. For example, a request packet 52 for the routing pattern A and a request packet 53 for the routing pattern B are inserted into the end field.

When the switching element receives the extended cell 50, the switching element takes the request packets 52 and 53 out of the extended cell 50 to carry out the same processing as that in the above described preferred embodiment.

In more detail, the request packets 52 and 53 are inserted into the end field of the extended cell 50 transmitted in the cell cycle N to decide the routing pattern of the actual cell 51 transmitted in the next cell cycle N+1. The request packets 52 and 53 are inserted into the extended cell 50 of which the target output port is the same as the target output port of the request packets 52 and 53. When there is not the extended cell 50 having the same target output port as the request packets 52 and 53 in the cell cycle N, a dummy extended cell which transmits only the request packets 52 and 53 is generated in the input ports IP0 through IP8 and the request packets 52 and 53 are inserted into the dummy extended cell to transmit. Or the request packets 52 and 53 are not transmitted in the cell cycle N.

As described above, according to the ATM switch in this preferred embodiment, it is possible to omit the input/output system for request packets and arbiters ARB0 and ARB1, which are shown in FIG. 2, so that it is possible to inhibit the hardware scale of the whole ATM switch from increasing.

(Fourth Preferred Embodiment)

In the fourth preferred embodiment of the present invention, the above described first preferred embodiment is modified so that the number of negative acknowledge signals with respect to request packets returning to input ports is counted.

Figure 9:
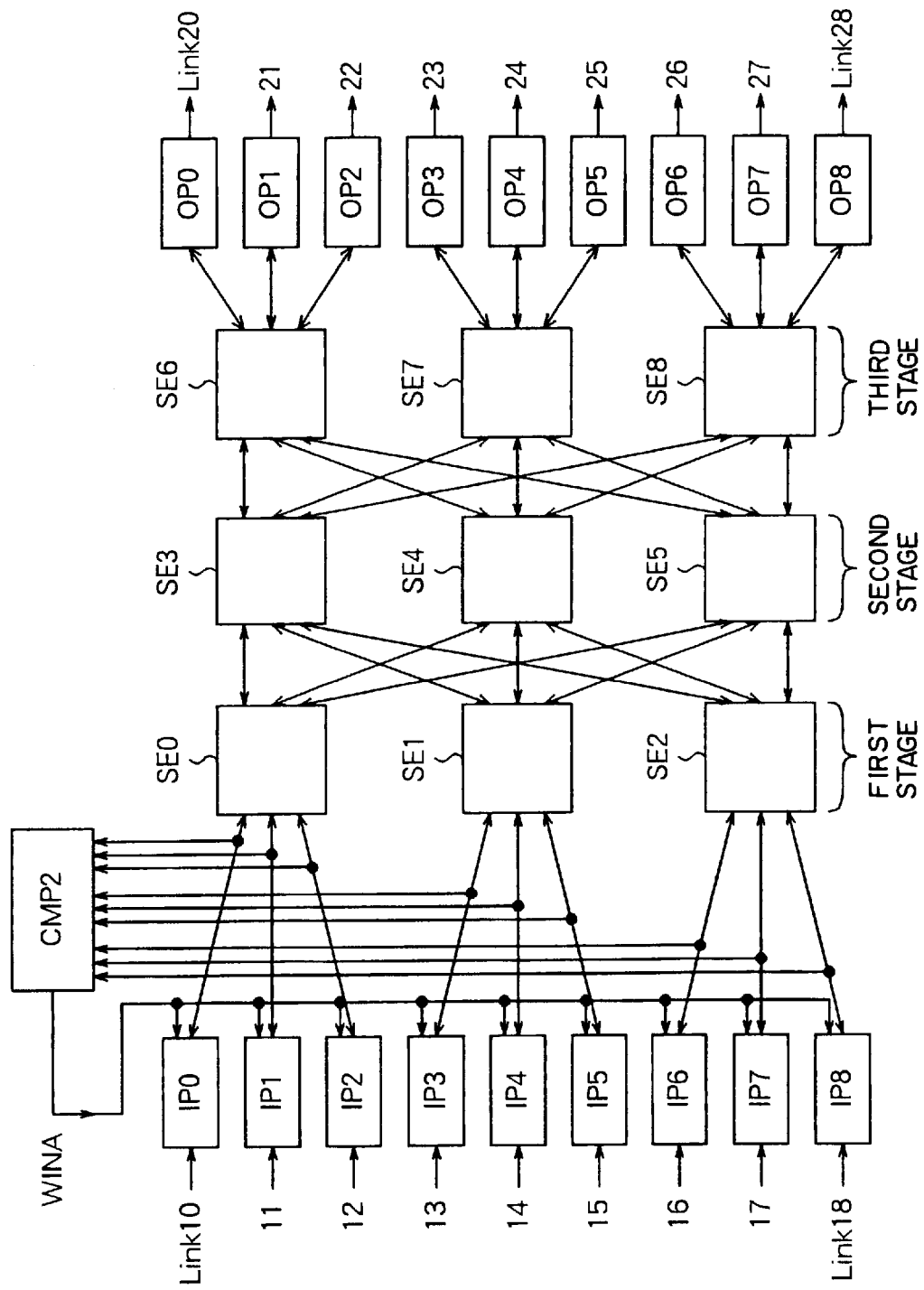
FIG. 9 is a diagram showing the whole construction of the fourth preferred embodiment of an ATM switch according to the present invention.

FIG. 9 shows the whole construction of an ATM switch in this preferred embodiment. As shown in FIG. 9, in the ATM switch in this preferred embodiment, the number of negative acknowledge signals for request packets returning to input ports IP0 through IP8 is counted by a negative acknowledge measuring/comparing circuit CMP2. That is, negative acknowledge signals are taken out between each of the input ports IP0 through IP8 and switching elements SE0 through SE2 to be inputted to the negative acknowledge measuring/comparing circuit CMP2.

The negative acknowledge measuring/comparing circuit CMP2 counts the number of negative acknowledges by routing pattern A and B to transmit a comparison result indicative signal WINA to each of the input ports IP0 through IP8. That is, when the number of negative acknowledges by the routing pattern A is less than the number of negative acknowledges by the routing pattern B, the number of request packets having reached a target one of output ports OP0 through OP8 by the routing pattern A is larger, so that the comparison result indicative signal WINA is caused to be in a high level. On the other hand, when the number of negative acknowledges by the routing pattern B is less than the number of negative acknowledges by the routing pattern A, the number of request packets having reached a target one of the output ports OP0 through OP8 by the routing pattern B is larger, so that the comparison result indicative signal WINA is caused to be in a low level.

On the basis of the comparative result indicative signal WINA, the input ports IP0 through IP8 transmit actual cells in the next cell cycle by a routing pattern, by which the number of request packets having reached the target one of the output ports OP0 through OP8 is larger. In addition, similar to the above described first preferred embodiment, when the request packets transmitted in the last cell cycle are to be transmitted by a routing pattern, by which a negative acknowledge signal has been received, the input ports IP0 through IP8 are not designed to transmit actual cells in the next cell cycle.

Furthermore, when the number of negative acknowledges by the routing pattern A is the same as the number of negative acknowledges by the routing pattern B, it is previously set to select the routing pattern A, for example. In addition, the circuit construction of the negative acknowledge measuring/comparing circuit CHP2 may be any one of the above described constructions shown in FIGS. 4 through 6.

As described above, while the number of request packets having reached the output part of the switching network has been counted and compared in the above described first through third preferred embodiments, the ATM switch in this preferred embodiment is designed to count and compare the number of negative acknowledges for request packets returning to the input part of the switching network. Even in such a construction, similar to the above described first through third preferred embodiments, it is possible to previously predict the number of passable cells to improve the throughput of the ATM switch.

(Fifth Preferred Embodiment)

In the fifth preferred embodiment of the present invention, the routing pattern for cells transmitted in the next cell cycle is changed by the number of discarded cells in the last cell cycle. That is, because of predicting the number of discarded cells in the next cell cycle on the basis of the number of discarded cells in the last cell cycle, the throughput of an ATM switch is improve.

Figure 10:
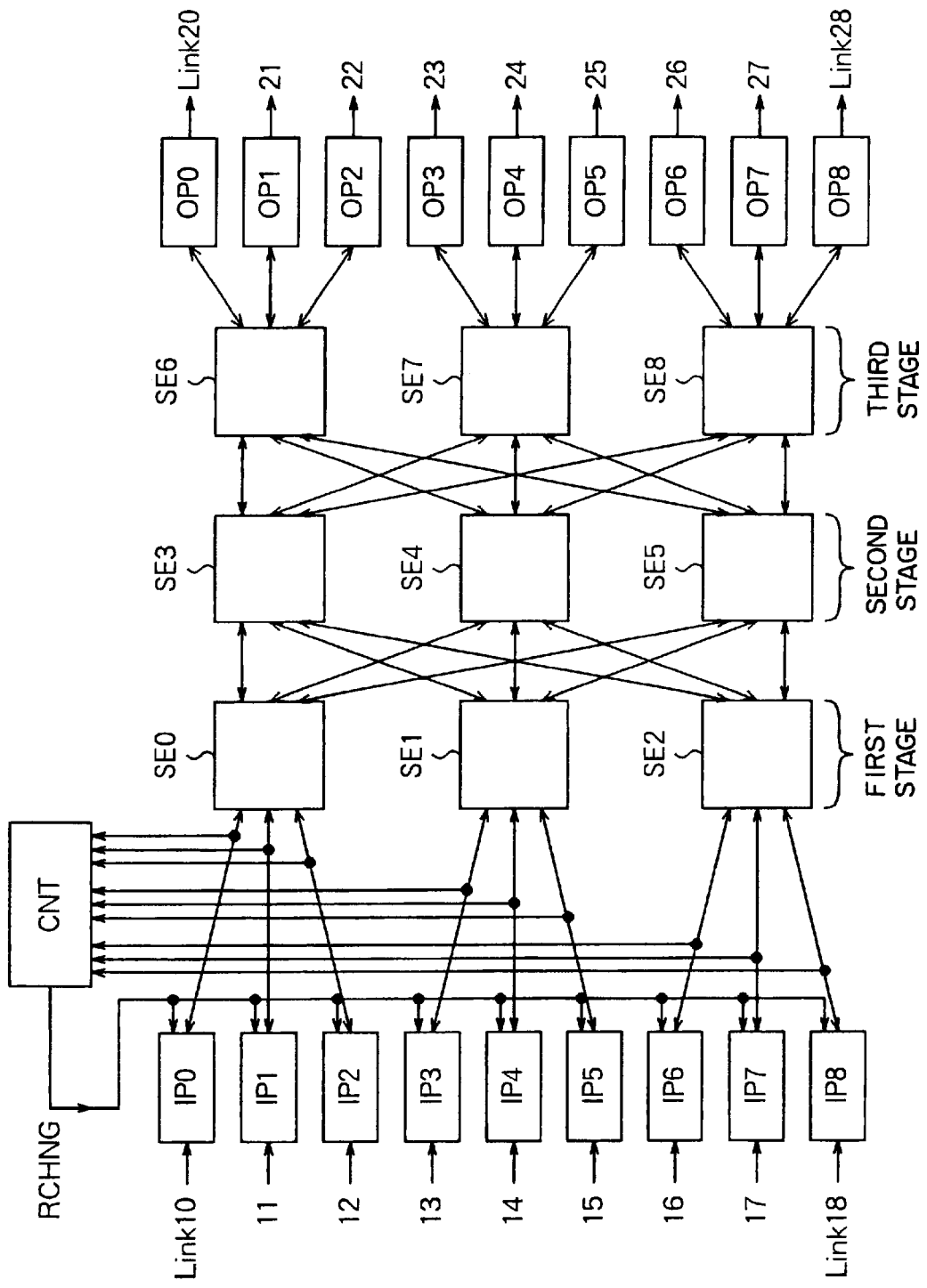
FIG. 10 is a diagram showing the whole construction of the fifth preferred embodiment of an ATM switch according to the present invention.

FIG. 10 shows the whole construction of an ATM switch in this preferred embodiment. As shown in FIG. 10, the ATM switch in this preferred embodiment has a discarded cell number counting circuit This ATM switch is designed to determine a routing pattern at random or by a predetermined algorithm in a certain cell cycle N to transmit actual cells. In this cell cycle N, negative acknowledge signals are returned to a corresponding one or more of input ports IP0 through IP8, from which cells discarded by switching elements SE0 through SE8 have been transmitted. The discarded cell number counting circuit CNT counts the number of the returned negative acknowledge signals.

When the number of the discarded cells reaches a predetermined value or a predetermined rate, the input ports IP0 through IP8 switch the routing pattern to another routing pattern (e.g., a pattern complementary to the first routing pattern) in the next cell cycle N+1 to transmit cells. On the other hand, when the number of the discarded cells does not reach the predetermined value or the predetermined rate, the input ports IP0 through IP8 transmit cells by the same routing pattern even in the next cell cycle N+1. The predetermined rate is, e.g., ½ of all of the transmitted cells.

In order to thus operate the input ports IP0 through IP8, the discarded cell number counting circuit CNT outputs a switching indicative signal RCHNG to the input ports IP0 through IP8. When the switching indicative signal RCHNG is in a high level, each of the input ports IP0 through IP8 transmits cells in the next cell cycle by a routing pattern different from the routing pattern, by which the cells have been transmitted in the last cell cycle.

As described above, according to the ATM switch in this preferred embodiment, the number or rate of discarded cells in the next cell cycle is predicted on the basis of the number or rate of discarded cells in the last cell cycle, and when it is predicted that the number or rate of discarded cells is large if cells are transmitted in the next cell cycle by the same routing pattern as the last cell cycle, the cells are transmitted by a routing pattern different from that in the last cell cycle, so that it is possible to improve the throughput of the ATM switch.

In general, since the cells inputted from input links Link 10 through Link 18 are often continuously transmitted to the same target output link of the output links Link 20 through Link 28, the number of discarded cells in the next cell cycle can be sufficiently predicted on the basis of the number of discarded cells in the last cell cycle.

(Sixth Preferred Embodiment)

In the sixth preferred embodiment of the present invention, request packets are transmitted by one routing pattern in the last cell cycle, and when the number of negative acknowledge signals for the request packets is larger than a predetermined number or when the rate thereof is higher than a predetermined rate, actual cells are transmitted by a routing pattern different from the one routing pattern.

Figure 10A:
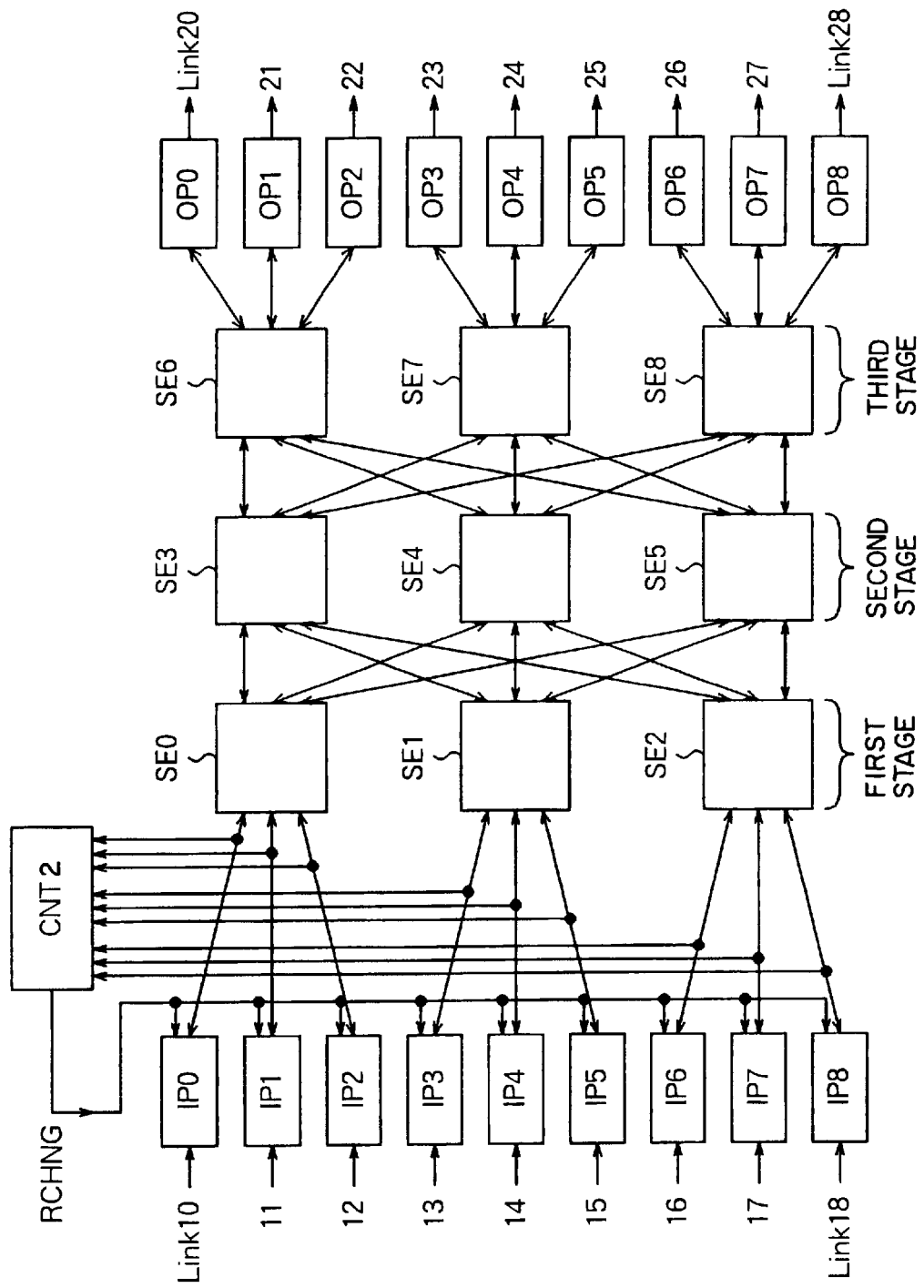
FIG. 10A is a diagram showing the whole construction of the sixth preferred embodiment of an ATM switch according to the present invention.
Figure 11:
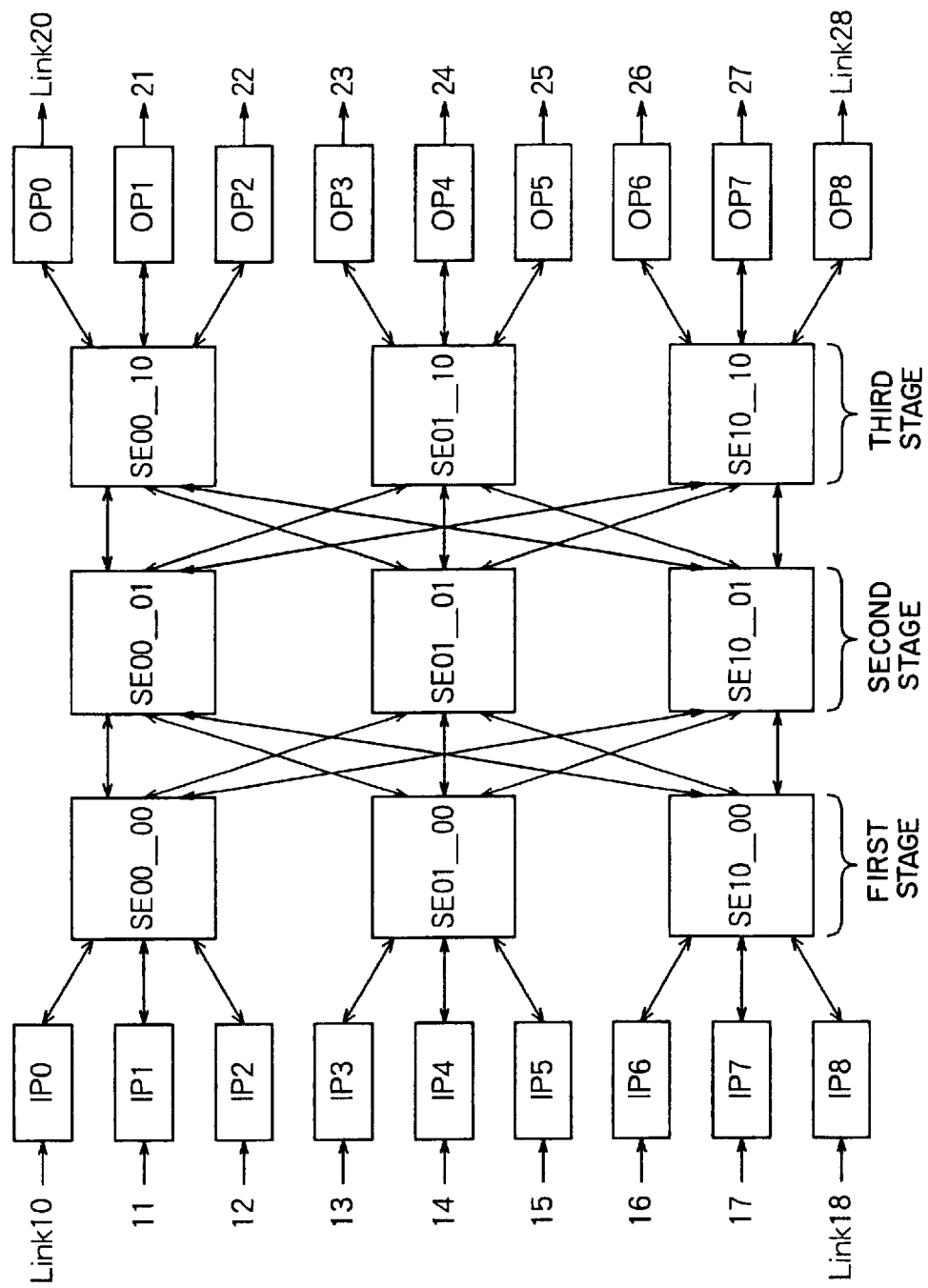
FIG. 11 is a diagram showing the whole construction of a conventional ATM switch.
Figure 12:
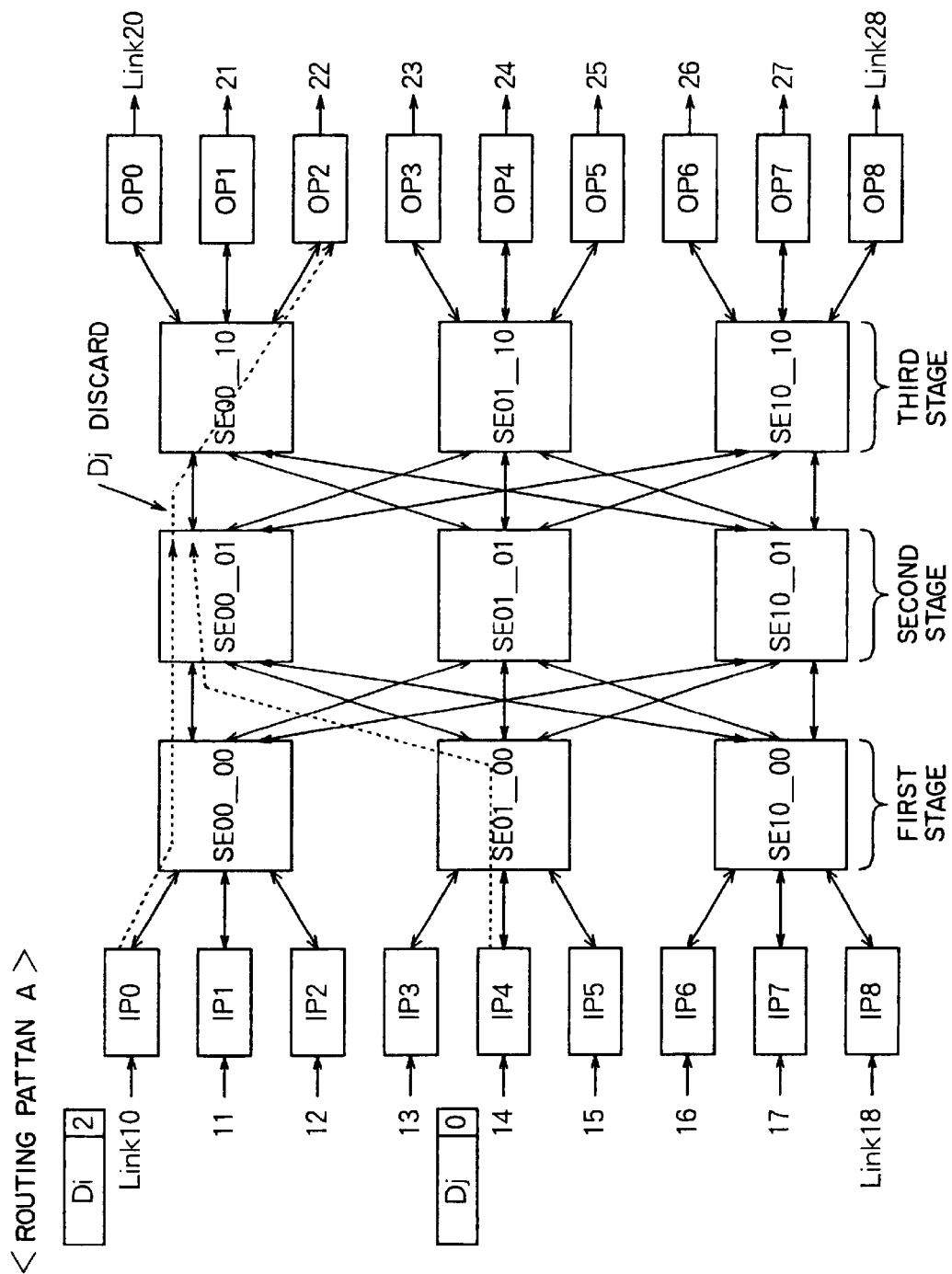
FIG. 12 is a diagram for explaining the state that two cells, which are to be transmitted to different target output ports, collide with each other in a switching element.
Figure 13:
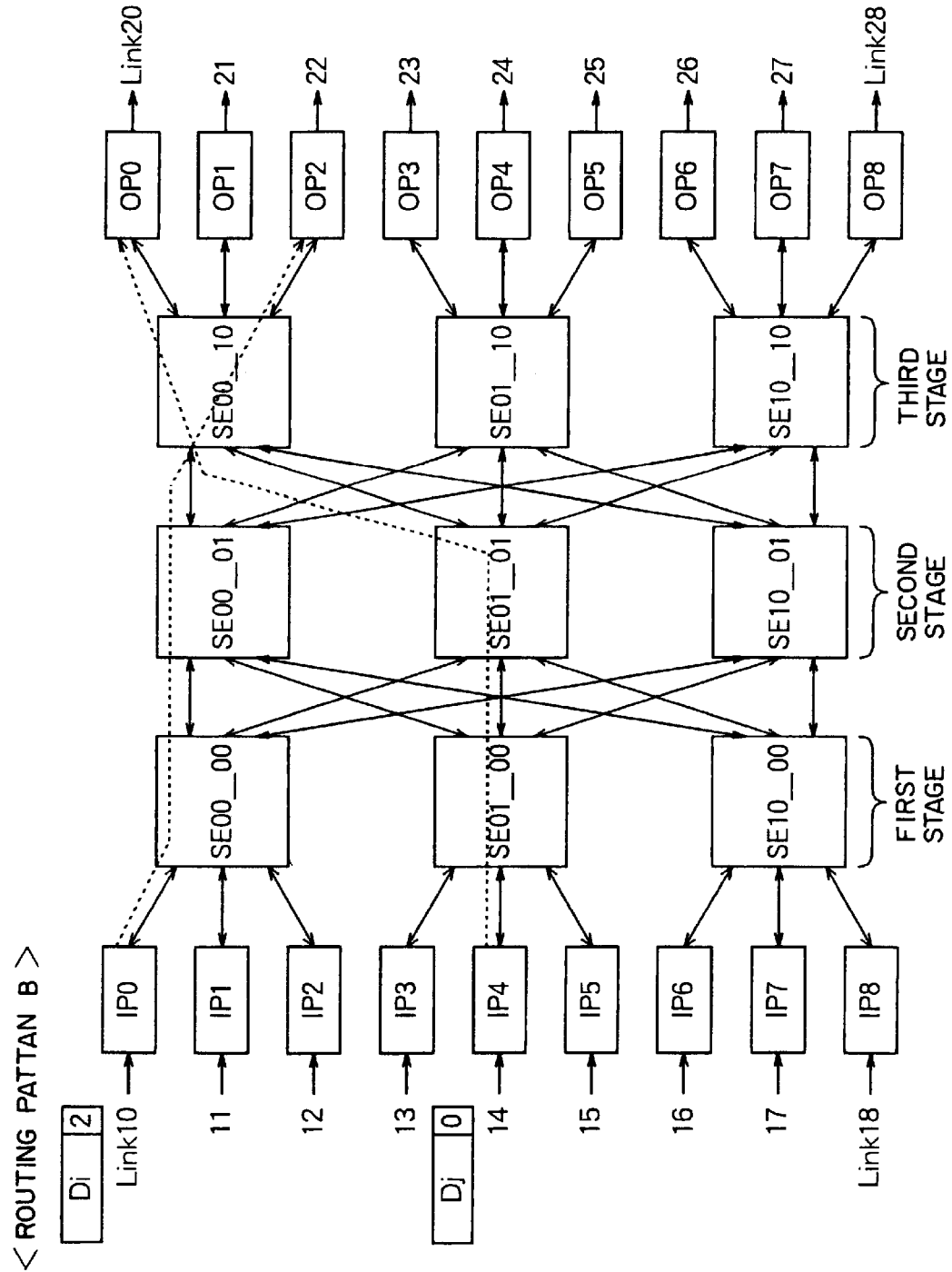
FIG. 13 is a diagram for explaining that the two cells, which are to be transmitted to the same target output ports as those in FIG. 12, do not collide with each other.

FIG. 10A shows the whole construction of an ATM switch in this preferred embodiment. As shown in FIG. 10A, the ATM switch in this preferred embodiment has a negative acknowledge number counting circuit CNT2. In addition, each of switching elements SE0 through SE8 has only one first arbiter ARB0 shown in FIG. 2.

This ATM switch is designed to determine a routing pattern A at random or by a predetermined algorithm to transmit request packets in a certain cell cycle N. For the request packets discarded by the switching elements SE0 through SE8 in the cell cycle N, negative acknowledge signals are returned to a corresponding one or more of input ports IP0 through IP8, from which the request packets have been transmitted. The number of the returned negative acknowledge signals is counted by the negative acknowledge number counting circuit CNT2.

When the number of the negative acknowledge signals reaches a predetermined value or when the rate thereof reaches a predetermined rate, the input ports IP0 through IP8 switch the routing pattern to another routing pattern B (e.g., a pattern complementary to the first routing pattern) in the next cell cycle N+1 to transmit actual cells. On the other hand, when the number of the negative acknowledge signals does not reach the predetermined value or when the rate thereof does not reach the predetermined rate, the input ports IP0 through IP8 transmit actual cells by the routing pattern A in the next cell cycle. The predetermined rate is ½ of all of the transmitted request packets.

In order to thus operate the input ports IP0 through IP8, the negative acknowledge number counting circuit CNT2 outputs a switching indicative signal RCHNG to each of the input ports IP0 through IP8. When the switching indicative signal RCHNG is in a high level, each of the input ports IP0 through IP8 transmits actual cells in the next cell cycle N+1 by a routing pattern different from a routing pattern, by which the request packets have been transmitted in the cell cycle N.

As described above, according to the ATM switch in this preferred embodiment, when the number of negative acknowledge signals transmitted by the request packets in the last cell cycle is larger or when the rate thereof is higher, actual cells are transmitted by a different routing pattern, so that it is possible to improve the throughput of the ATM switch.

In addition, the ATM switch in this preferred embodiment can be realized by very small hardware resources since it has only to provide the negative acknowledge number counting circuit CNT2 between the input ports IP0 through IP8 and the switching elements SE0 through SE2.

Furthermore, the present invention should not be limited to the above described preferred embodiments and can be modified in various ways. For example, the routing pattern B has been complementary to the routing pattern A in the above described preferred embodiments, the routing pattern B may be another pattern. For example, the routing pattern B may be determined at random similar to the routing pattern A.

In addition, while the number of cells reaching the target output ports OP0 through OP8 has been predicted using two kinds of routing patterns A and B in the above described preferred embodiments, it may be predicted using three, four or more kinds of routing patterns. In such cases, the switching element shown in FIG. 2 may be provided with arbiters, the number of which corresponds to the number of the kinds of the routing patterns.

Moreover, while the examples of the ATM switches for switching the ATM cells have been described in the above described preferred embodiments, the present invention may be applied to a packet switch for switching packets. In addition, the packet may be either a fixed-length packet or a variable-length packet.

According to the switching element and packet switch of the present invention, it is possible to reduce the cell residence time in the input port of the packet switch to improve the throughput of the whole switch.

What is claimed is:

1. A switching element for use in a packet switch, comprising:
   a crossbar switch for inputting packets from a plurality of packet input paths and for outputting said packets from one of a plurality of packet output paths in accordance with routing pattern information included in said packets; and
   an arbiter for inputting request packets from a plurality of request input paths and for outputting said request packets from one of a plurality of request output paths in accordance with routing pattern information included in said request packets, said arbiter selecting and outputting one of said request packets when said request packets are to collide with each other to be outputted to the same request output path of said plurality of request output paths, wherein said arbiter returns a negative acknowledge signal to a transmission source or sources, from which the other request packet or request packets of said request packets being not selected have been transmitted, when said request packets collide with each other.

2. A packet switch comprising:
   a plurality of input ports for accumulating and sequentially transmitting inputted packets and for transmitting first request packets by a first routing pattern and second request packets by a second routing pattern;
   a switching network for sequentially outputting said packets and said first and second request packets, which have been inputted from said plurality of input ports, to a target output port via a plurality of switching elements arranged in the form of lattice, each of said switching elements including:
      a crossbar switch for inputting said packets from a plurality of packet input paths and for outputting said packets from one of a plurality of packet output paths in accordance with routing pattern information included in said packets;
      a first arbiter for inputting said first request packets from a plurality of first input paths and for outputting said first request packets from one of a plurality of first output paths in accordance with routing pattern information included in said first request packets, said first arbiter selecting and outputting one of said first request packets when said first request packets are to collide with each other to be outputted to the same first output path of said plurality of first output paths; and
      a second arbiter for inputting said second request packets from a plurality of second input paths and for outputting said second request packets from one of a plurality of second output paths in accordance with routing pattern information included in said second request packets, said second arbiter selecting and outputting one of said second request packets when said second request packets are to collide with each other to be outputted to the same second output path of said plurality of second output paths; and
   a result output circuit for outputting a comparison result indicative signal for causing said input ports to transmit packets by one of said first and second routing patterns in next cycle, by which more request packets have reached said output port, on the basis of the result of transmission of said first and second request packets.

3. A packet switch as set forth in claim 2, wherein said result output circuit outputs said comparative result indicative signal for causing said input ports to transmit said packets by a predetermined first or second routing pattern when the same number of said first and second request packets have reached said output port.

4. A packet switch as set forth in claim 3, wherein said first arbiter returns a first negative acknowledge signal to a transmission source or sources having transmitted said first request packet being not selected, when said plurality of first request packets collide with each other; and
   said second arbiter return a second negative acknowledge signal to a transmission source or sources having transmitted said second request packet being not selected, when said plurality of second request packets collide with each other.

5. A packet switch as set forth in claim 4, wherein in case of transmitting said packets by said first routing pattern, said input ports other than said input port having received said first negative acknowledge signal in the last cycle transmits said packets, and
   in case of transmitting said packets by said second routing pattern, said input port other than said input port having received said second negative acknowledge signal in the last cycle transmits said packets.

6. A packet switch as set forth in claim 5, wherein said result output circuit counts the number of said first and second request packets having reached said output port,
   outputs said comparison result indicative signal for causing said input ports to transmit said packet by said first routing pattern in the next cycle when the number of said first request packets is larger than the number of said second request packets, and
   outputs said comparison result indicative signal for causing said input ports to transmit said packet by said second routing pattern in the next cycle when the number of said second request packets is larger than the number of said first request packets.

7. A packet switch as set forth in claim 6, wherein said result output circuit comprises:
   a subtracter for inputting the number of said first and second request packets having reached said output ports and for calculating a difference between said first request packets and said second request packets to output a differential signal; and
   a register for inputting said differential signal to hold said differential signal for a predetermined period of time to output said comparative result indicative signal.

8. A packet switch as set forth in claim 6, wherein said result output circuit comprises:
   a first parallel/serial converter for inputting a first identification signal, which indicates whether said first request packets have reached said output port, in parallel every said output port to serially convert said first identification signal to output a first serial signal;

a second parallel/serial converter for inputting a second identification signal, which indicates whether said second request packets have reached said output port, in parallel every said output port to serially convert said second identification signal to output a second serial signal;

a first accumulator for inputting said first serial signal and for calculating the number of said first request packets having reached said output ports on the basis of said first serial signal to output a first digital signal;

a second accumulator for inputting said second serial signal and for calculating the number of said second request packets having reached said output ports on the basis of said second serial signal to output a second digital signal; and a comparator for inputting said first and second digital signals to digitally compare both to output said comparative result indicative signal.

9. A packet switch as set forth in claim 6, wherein said result output circuit comprises:

a first register for inputting a first bit map information indicative of the number of said first request packets having reached said output ports and for outputting first ON signals, the number of which is the same as the number of said first request packets having reached said output port, on the basis of said first bit map information;

a second register for inputting a second bit map information indicative of the number of said second request packets having reached said output ports and for outputting second ON signals, the number of which is the same as the number of said second request packets having reached said output port, on the basis of said second bit map information;

a first transistor group having first transistors, the number of which is the same as the number of said output ports, the number of said first transistors turned on being the same as the number of said first ON signal;

a second transistor group having second transistors, the number of which is the same as the number of said output ports, the number of said second transistors turned on being the same as the number of said second ON signal;

a first capacitor connected to said first transistor group, said first capacitor being more rapidly discharged as the increase of the number of said first transistors turned on;

a second capacitor connected to said second transistor group, said second capacitor being more rapidly discharged as the increase of the number of said second transistors turned on; and a level comparator for sensing a difference between the discharge duration of said first capacitor and the discharge duration of said second capacitor, said level comparator outputting said comparative result indicative signal for transmitting said packets by said first routing pattern when the discharge duration of said first capacitor is shorter than the discharge duration of said second capacitor, and outputting said comparative result indicative signal for transmitting said cell by said second routing pattern when the discharge duration of said second capacitor is shorter than the discharge duration of said first capacitor.

10. A packet switch as set forth in claim 4, wherein said result output circuit counts the number of said first and second negative acknowledge signals returned to said input port, outputs said comparative result indicative signal for causing said input ports to transmit said packet by said second routing pattern in the next cycle when the number of said first negative acknowledge signals is larger than the number of said second negative acknowledge signals, and outputs said comparative result indicative signal for causing said input ports to transmit said packet by said first routing pattern in the next cycle when the number of said second negative acknowledge signals is larger than the number of said first negative acknowledge signals.

11. A packet switch as set forth in claim 10, wherein in case of transmitting said packets by said first routing pattern, said input ports other than said input port having received said first negative acknowledge signal in the last cycle transmits said packets, and in case of said input ports transmits said packets by said second routing pattern, said input ports other than said input port having received said second negative acknowledge signal in the last cycle transmits said packets.

12. A packet switch comprising:

a plurality of input ports for accumulating and sequentially transmitting inputted packets, and for transmitting first request packets by a first routing pattern in the first half of a cycle before said packets are transmitted and for transmitting second request packets by a second routing pattern in the second half of said cycle;

a switching network for sequentially outputting said packets and said first and second request packets, which have been inputted from said plurality of input ports, to a target output port via a plurality of switching elements arranged in the form of lattice, each of said switching elements including:

a crossbar switch for inputting said packets from a plurality of packet input paths and for outputting said packets from one of a plurality of packet output paths in accordance with routing pattern information included In each of said packets; and an arbiter for inputting said first and second request packets from a plurality of request input paths and for outputting said first and second request packets from one of a plurality of request output paths in accordance with routing pattern information included in said first and second request packets, said arbiter selecting and outputting one of said first request packets when one of said first request packets collide with another of said first request packets to be outputted to the same request output path, and said arbiter selecting and outputting one of said second request packets when one of said second request packets collide with another of said second request packets to be outputted to the same request output path; and a result output circuit for outputting a comparison result indicative signal for causing said input ports to transmit packets by a routing pattern of said first and second routing patterns in next cycle, by which more request packets have reached said output port, on the basis of the result of transmission of said first and second request packets.

13. A packet switch as set forth in claim 12, wherein said result output circuit outputs said comparative result indicative signal for causing said input ports to transmit said packets by a predetermined first or second routing pattern when the same number of said first and second request packets have reached said output port.

14. A packet switch as set forth in claim 13, wherein said arbiter returns a first negative acknowledge signal to a transmission source or sources having transmitted said first request packet being not selected, when one of said first request packets collide with another of said first request packets, and returns a second negative acknowledge signal to a transmission source or sources having transmitted said second request packet being not selected, when one of said second request packets collide with another of said second request packets.

15. A packet switch as set forth in claim 14, wherein in case of transmitting packets by said first routing pattern, said input ports other than said output port having received said first negative acknowledge signal in the last cycle transmits said packets, and in case of transmitting said packets by said second routing pattern, said input ports other than said output port having received said second negative acknowledge signal in the last cycle transmits said packets.

16. A packet switch comprising:

a plurality of input ports for accumulating and sequentially transmitting inputted packets;

a switching network for outputting said packets inputted from said plurality of input ports, to a target output port sequentially via a plurality of switching elements arranged in the form of lattice, each of said switching elements having a crossbar for selecting and outputting one of said packets when said packets collide with each other to be outputted to the same output path and for returning negative acknowledge signals to an input port, from which one of said packets being not selected has been transmitted; and a switching signal output circuit for counting the number of said negative acknowledge signals returned to said input ports and for outputting a switching indicative signal for causing said input ports to switch a routing pattern when the counted number of said negative acknowledge signals exceeds a predetermined value.

17. A packet switch comprising:

a plurality of input ports for accumulating and sequentially transmitting inputted packets and for transmitting request packets by one routing pattern;

a switching network for sequentially outputting said packets and said request packets, which have been inputted from said plurality of input ports, to a target output port via a plurality of switching elements arranged in the form of lattice, each of said switching elements including:

a crossbar switch for inputting said packets from a plurality of packet input paths and for outputting said packets from one of a plurality of packet output paths in accordance with routing pattern information included in said packets; and an arbiter for inputting said request packets from a plurality of request input paths and for outputting said request packets from one of a plurality of request output paths in accordance with routing pattern information included in said request packets, said arbiter selecting and outputting one of said request packets when one of said request packets collides with another of said request packets to be outputted to the same request output path of said request output paths, and said arbiter returning negative acknowledge signals to a transmission source or sources having transmitted said request packets being not selected; and a switching signal output circuit for counting the number of said negative acknowledge signals returned to said input ports and for outputting a switching indicative signal for causing said input ports to transmit packets by a routing pattern different from said one routing pattern in next cycle.

18. A packet switch as set forth in claim 17, wherein said output ports have a first routing pattern and a second routing pattern different from said first routing pattern, as said routing pattern, and which alternately select one of said first and second routing patterns on the basis of input of said switching indicative signal.

* * * * *